United States Patent
Pippert et al.

(10) Patent No.: US 9,225,165 B2
(45) Date of Patent: Dec. 29, 2015

(54) SURGE ARRESTER WITH EXTENDABLE COLLAR

(75) Inventors: Erhard Pippert, Dallgow-Doeberritz Ot Seeburg (DE); Dirk Springborn, Berlin (DE); Markus Sulitze, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 243 days.

(21) Appl. No.: 13/884,048

(22) PCT Filed: Nov. 7, 2011

(86) PCT No.: PCT/EP2011/069527
§ 371 (c)(1),
(2), (4) Date: May 8, 2013

(87) PCT Pub. No.: WO2012/062695
PCT Pub. Date: May 18, 2012

(65) Prior Publication Data
US 2013/0222964 A1    Aug. 29, 2013

(30) Foreign Application Priority Data
Nov. 9, 2010   (DE) .......................... 10 2010 043 655

(51) Int. Cl.
*H02H 9/00*   (2006.01)
*H02H 9/04*   (2006.01)
*H01C 7/12*   (2006.01)

(52) U.S. Cl.
CPC ................. *H02H 9/041* (2013.01); *H01C 7/12* (2013.01); *H01C 7/126* (2013.01)

(58) Field of Classification Search
CPC .................................................... H01L 23/552

USPC .......................................................... 361/118
See application file for complete search history.

(56) References Cited

U.S. PATENT DOCUMENTS

| 4,853,670 | A | 8/1989 | Stengard |
| 5,608,597 | A | 3/1997 | Holmström et al. |
| 8,009,402 | B2 * | 8/2011 | Klaube .......................... 361/127 |
| 2009/0042457 | A1 | 2/2009 | Normoyle et al. |
| 2010/0237980 | A1 | 9/2010 | Klaube et al. |
| 2011/0216464 | A1 | 9/2011 | Barenthin et al. |

FOREIGN PATENT DOCUMENTS

| DE | 10104393 C1 | 4/2002 |
| DE | 69534541 T2 | 7/2006 |

(Continued)

*Primary Examiner* — Stephen W Jackson
(74) *Attorney, Agent, or Firm* — Laurence Greenberg; Werner Stemer; Ralph Locher

(57) ABSTRACT

A surge arrester has a collar for fixing tensioning elements. The collar is extendable and is capable of absorbing released energy in the event of a fault and holding together the cage containing the tensioning elements. The collar, which fixes the tensioning elements in the radial direction, is positioned around the cage of the surge arrester formed from the tensioning elements. The form of the collar is such that it has defined deformation regions, with the result that the collar can expand and thus widen in the event of a force effect in the radial direction. If the varistor elements expand in the manner of an explosion during an overload, the collar is expanded and absorbs some of the released energy. This ensures that the cage is held together in the event of an overload and thus no fragments of the varistor elements can be flung out of the cage.

6 Claims, 3 Drawing Sheets

(56) References Cited

FOREIGN PATENT DOCUMENTS

| DE | 102008005678 A1 | 9/2008 |
| DE | 102007048986 A1 | 5/2009 |
| DE | 102008057232 A1 | 5/2010 |
| EP | 0280189 A1 | 8/1988 |
| JP | 63312602 A | 12/1988 |
| WO | 02058083 A2 | 7/2002 |
| WO | 2006000743 A1 | 1/2006 |
| WO | 2009050011 A1 | 4/2009 |

* cited by examiner

SURGE ARRESTER WITH EXTENDABLE COLLAR

BACKGROUND OF THE INVENTION

Field of the Invention

The invention relates to a surge arrester having a collar for fixing tensioning elements, which collar is extendable and thus in the event of a malfunction said collar can absorb the released energy and can hold together the cage that comprises the tensioning elements.

Surge arresters are protective systems for power supply systems, which surge arresters in the event of voltage surges as a result of a lightning strike or malfunctions of other part systems divert these voltage surges to ground and thus protect other components of the power supply system.

A surge arrester of this type comprises a cylindrical arrester column that is mainly embodied as a stack of individual likewise cylindrical varistor elements. Varistor elements are characterized by a voltage-dependent resistance and act as insulators in the case of low voltages. They demonstrate good conductance properties when the voltage is above a particular threshold voltage that is dependent upon the material. Varistor elements are frequently manufactured from metal oxides such as zinc oxide. The arrester column is defined at both ends by end fittings that produce the electrical contact with the power supply system and to ground. In order to ensure a good electrical contact even in the presence of mechanical loads, the varistor elements must be held together under pressure. This can be achieved in that tensioning elements, for example ropes or rods that are preferably embodied from glass-fiber reinforced synthetic material, are clamped under tension in the end fittings. The tensioning elements surround the arrester column and thus form a cage around said column. In order to provide protection against environmental influences, surge arresters of this type are encompassed by a casing that is embodied from an insulating material, for example silicone. This casing can be produced by means of casting or injection molding processes.

The varistor elements can extend in an explosive manner in the event of an overload on the surge arrester. The cage that is formed by the tensioning elements is intended even in this case to hold the arrester column together and to prevent fragments of the varistor elements from being expelled outwards.

One problem in the case of surge arresters of this type resides in the fact that the explosive energy that occurs in the event of an overload of this type destroys the tensioning elements or deforms the cage that is formed by said tensioning elements, so that fragments of the varistor elements can escape.

DE 101 04 393 C1 describes supporting plates having cut-outs through which the tensioning elements are inserted and thus said tensioning elements are fixed in a plane that is perpendicular with respect to the longitudinal axis of the surge arrester. This has the disadvantage that in the event of an overload the tensioning elements can be severed at the edges of the support plates.

The tensioning elements disclosed in U.S. Pat. No. 5,608, 597 A1 are surrounded and consequently fixed by a bandage that is embodied from a glass-fiber reinforced synthetic material. The bandages are embodied from a glass-fiber reinforced synthetic material and consequently cannot expand. In addition, the epoxy resin that is frequently used is flammable and can ignite in the event of an overload.

BRIEF SUMMARY OF THE INVENTION

The object of the present invention is therefore to provide a surge arrester having a collar for fixing the tensioning elements, which collar prevents the tensioning elements from being destroyed or damaged.

The object is achieved using the surge arrester mentioned in the introduction by virtue of the fact that the collar lies against the outside of the arrestor column of the surge arrester and comprises radial protuberances that receive the encompassed tensioning elements and fix said tensioning elements in the tangential direction with respect to the center axis of the surge arrester.

The portions of the collar that lie between the protuberances are used as deformation zones. The collar can expand in these portions and thus absorb energy in the event of an overload. By means of this, the forces that act upon the tensioning elements, in particular the shearing forces that act on the edges of the collar, can be reduced to the extent that the tensioning elements are not damaged. The cage that is formed by the tensioning elements is as a consequence held together even in the event of an overload, so that fragments of the varistor elements are not expelled outwards and cannot damage other components in the vicinity.

The collar can be manufactured in a cost-effective manner by shaping from a band-like semi-finished product, for example from high grade steel. The then originally open fixing collar can then be closed either prior to or during the assembly process by connecting its two ends for example by means of rivets, screws, welding or soldering.

Cylindrical intermediate pieces are inserted between two varistor elements into the arrester column. Said intermediate pieces can be used to adjust the length, or if conductive material is used for the intermediate pieces, to provide an improved contact with the varistor elements. If recesses are provided on the peripheral surface of the intermediate pieces in the radial direction, then the collar can be embodied in such a manner that depressions that lie between the protuberances of the collar fit closely in the recesses in the intermediate piece. As a consequence, this increases the size of the deformation zone of the collar, so that said collar can extend to a greater extent and consequently can absorb a greater amount of deformation energy. In addition, the inner portions of the depressions lie in the longitudinal direction of the arrester column between two varistor elements and are thus fixed in the longitudinal direction of the arrester column. In a further embodiment of the invention, the collar can comprise a plurality of part segments. The intermediate piece comprises in this case slot-like cut-outs in a cover surface and said slot-like cut-outs extend from one site on the peripheral surface to a further site on the peripheral surface. The depth of the slot-like cut-outs is to be dimensioned such that it does not penetrate the thickness of the intermediate piece. The inner portion of the part segments of the collar is formed in each case in such a manner that said part segments can be inserted into the slot-like cut-out in the longitudinal direction of the arrester column. The protuberances of a part segment encompass only a part of the tensioning elements. For example, in an arrester column having eight tensioning elements the collar comprises four part segments, of which each part segment encompasses two tensioning elements. As a consequence, the inner portions of the part segments are received in the slot-like cut-outs of the intermediate pieces and are fixed in the radial, tangential direction and in the longitudinal direction with respect to the center axis of the arrester column. Even if the part collars extend in the event of an overload and as a consequence expand, they are still held in place in this manner and they can thus still hold the cage together. In a further advantageous embodiment, the part segments can comprise an open shape. The ends of the part segments are formed for example by means of bending over the ends in such a manner that correspondingly shaped expanded areas on the inner-lying end of the slot-like cut-outs of the intermediate pieces receive the ends of the part segments and thus fix the part segments. As a result of the open shape, it is not necessary to thread the part segments over the ends of the tensioning elements but rather said part segments can be pushed onto the tensioning elements in the radial direction from the outside and subsequently can be pushed in the longitudinal direction of the arrester column into the slot-like cut-outs. This considerably facilities the process of assembling the arrester column.

Further details of the invention are described hereinunder with reference to the drawing. Like or corresponding elements in the drawing are provided in the individual figures with like reference numerals in each case, wherein said like elements are only explained more than once if there are differences between the individual figures. In the drawing:

DESCRIPTION OF THE INVENTION

Figure 1:
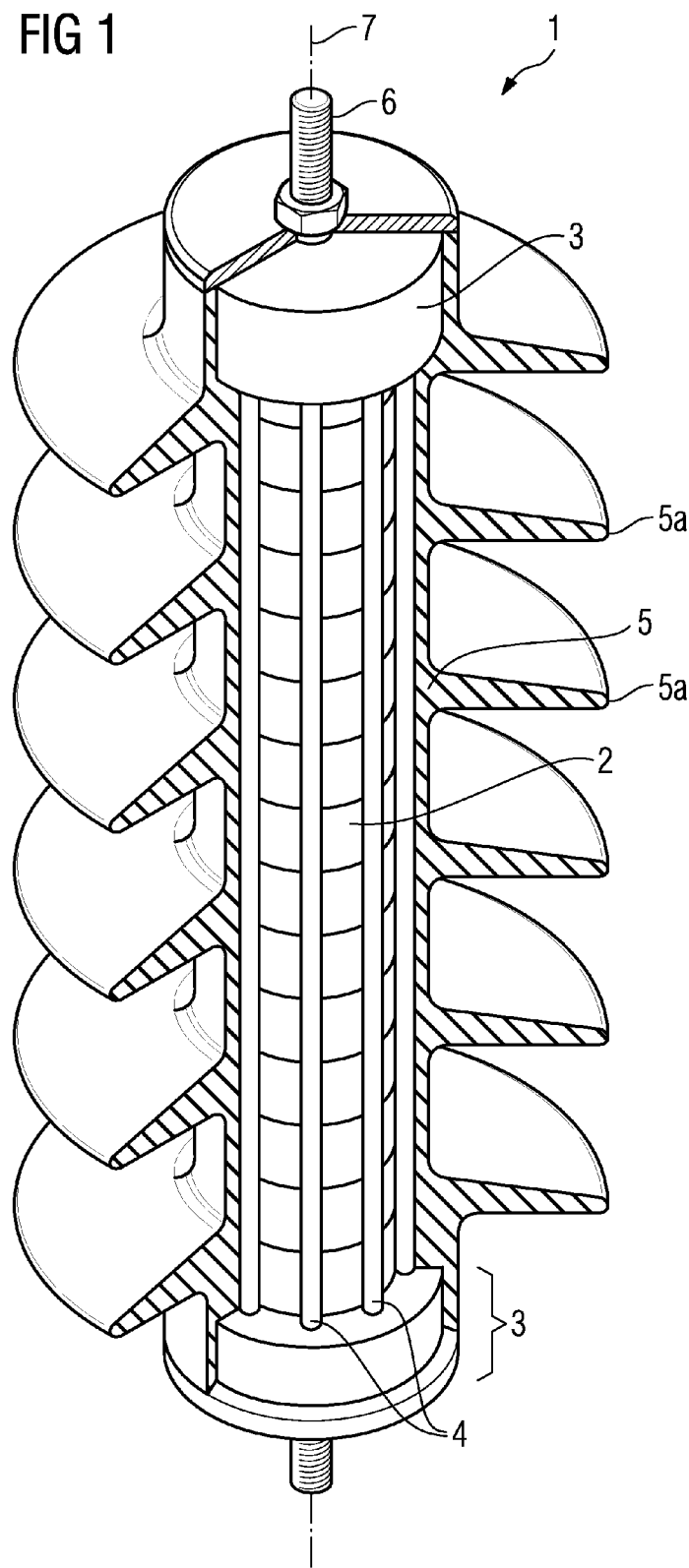
FIG. 1 shows a cross-sectional view of a surge arrester known in the prior art.

FIG. 1 illustrates a conventional surge arrester 1 in the so-called cage design having an arrester column 2 that comprises a plurality of varistor elements. In addition to the varistor elements, the arrester column 2 can also comprise further elements, for example metal blocks (not illustrated) for adjusting the length. The arrester column 2 is held at both ends by end fittings 3. It is possible to connect the surge arrester to the power supply system by means of a threaded rod 6 that protrudes out of the end fitting 3. In order to achieve the required mechanical strength, for example with respect to bending loads, tensioning elements 4 that lie around the arrester column and parallel to the center axis 7 of the surge arrester are clamped under tension in the end fittings 3 and said tensioning elements hold the arrester column 2 together under tension. These tensioning elements 4 are embodied as rods from glass-fiber reinforced synthetic material. In order to provide protection against environmental influences, the surge arrester is provided with an outer casing 5 that is frequently embodied from silicone. Shields 5a are provided on the outer face of the casing 5 in order to increase the creepage distance of the current.

Figure 2:
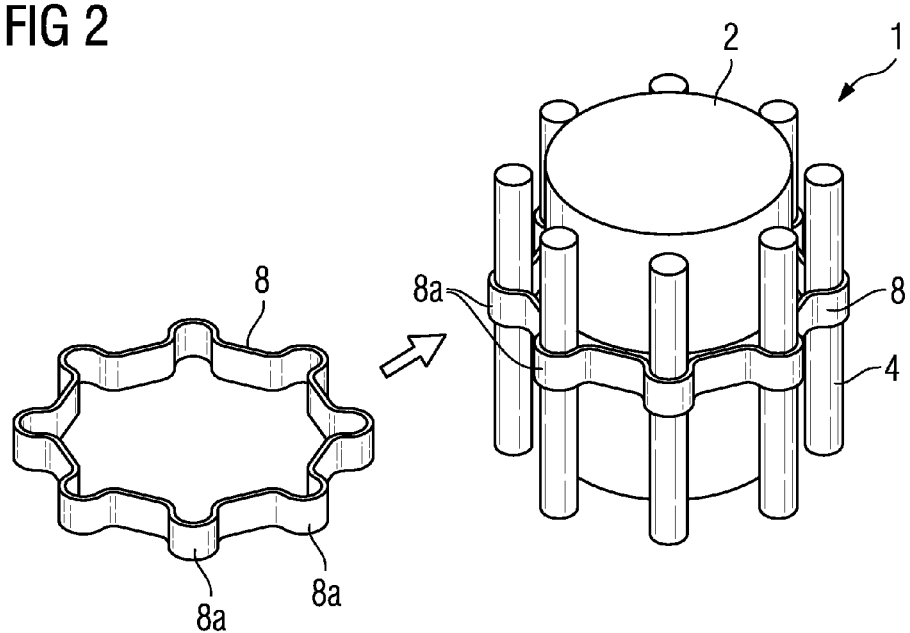
FIGS. 2 to 5 show three-dimensional illustrations of exemplary embodiments for collars of surge arresters in accordance with the invention.

FIG. 2 illustrates a radial cross-sectional view through a surge arrester 1 without the outer casing and having a collar 8 that can extend in accordance with the invention. The collar comprises protuberances 8a that receive the tensioning elements 4. The collar encompasses the tensioning elements 4 in a plane that lies in a perpendicular manner with respect to the center axis 7 of the surge arrester 1. The portions of the collar that lie between the tensioning elements lie against the outside of the arrester column 2. The collar can be manufactured by shaping from an electrically conductive material, for example from high grade steel from a band-like semi-finished product. The then originally open fixing collar can be closed either prior to or during the assembly process by connecting its two ends for example by means of rivets, screws, welding or soldering. The portions of the collar 8 that lie between the protuberances 8a of the collar 8 are used as deformation zones. In the event of an overload, the collar can expand in these deformation zones and thus partially absorb the explosive energy that occurs.

Figure 3:
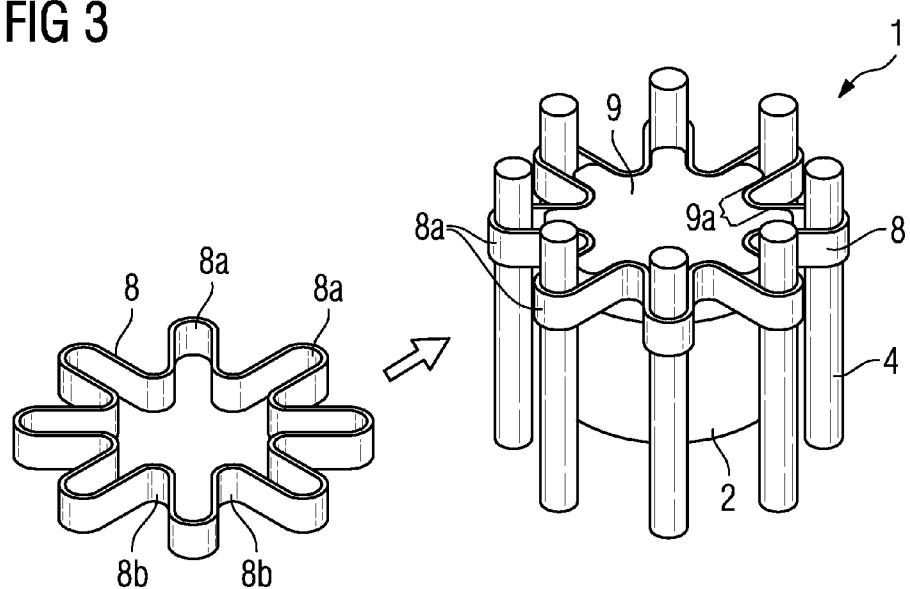

FIG. 3 illustrates a further exemplary embodiment of a collar 8 in accordance with the invention. In this case, cylindrical intermediate pieces 9 are inserted into the arrester column 2, only one of said intermediate pieces being illustrated here. The intermediate pieces lie in the longitudinal direction of the arrester column between two varistor elements. The peripheral surface of the intermediate piece comprises radial recesses 9a. The collar comprises depressions 8b that lie between the protuberances 8a (that encompass the tensioning elements 4), which depressions fit closely in the recesses 9a in the intermediate piece 9. The depressions 8b represent the deformation zones in which the collar can expand. However, in contrast to the deformation zone of the exemplary embodiment of a collar that is illustrated in FIG. 2, these exemplary embodiments comprise a larger deformation area. Since the portions of the depressions 8b that engage into the recesses 9a of the intermediate piece 9 engage in the radial direction into the space between the two varistor elements, which space is formed by means of the recesses of the intermediate piece between two varistor elements, the entire collar is fixed in the longitudinal direction of the arrester column.

Figure 4:
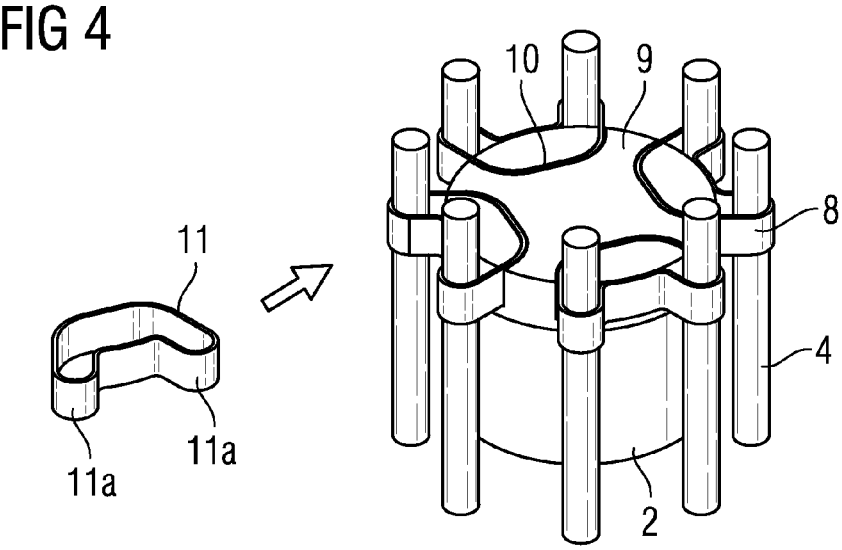

FIG. 4 illustrates a further exemplary embodiment of a collar 8 in accordance with the invention. A cylindrical intermediate piece 9 that is inserted into the arrester column 2 comprises slot-like cut-outs 10 in a cover surface and said cut-outs extend from one site on the peripheral surface to a further site on the peripheral surface. The depth of the slot-like cut-outs 10 is less than the thickness of the intermediate piece 9. The collar 8 comprises in this case four similar part segments 11. One of the slot-like cut-outs 10 is provided for each of the part segments 11. The part segments 11 comprise in each case a closed shape. The slot-like cut-outs 10 of the intermediate piece 9 receive a portion of the part segment and thus fix the part segment 11 in a cross-sectional plane of the arrester column 2. The protuberances 11a of the part segments 11 that lie outside the arrester column 2 encompass the tensioning elements 4.

Figure 5:
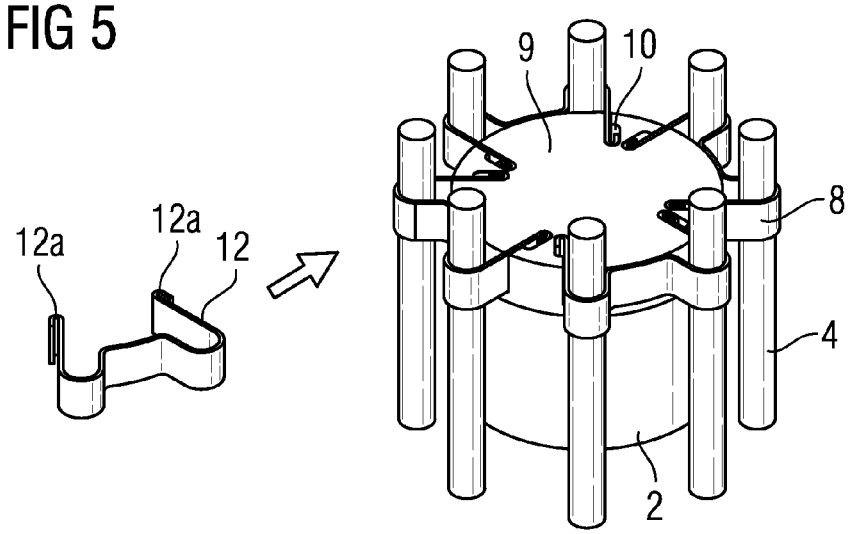

FIG. 5 illustrates a similar exemplary embodiment as shown in FIG. 4. The collar 8 here also comprises similar part segments 12. However, in this case, the part segments 12 comprise an open shape. A cylindrical intermediate piece 9 is likewise inserted into the arrester column 2, said intermediate piece comprising slot-like cut-outs 10 in the cover surface, which cut-outs lead in each case to a site on the peripheral surface of the intermediate piece 9. Two slot-like cut-outs 10 of this type are provided for each part segment 12. The depth of the slot-like cut-outs 10 can be slightly less than the thickness of the intermediate piece 9, but said cut-outs can also penetrate the intermediate piece 9 as far as the opposite cover surface.

The ends 12a of the part segments are outwardly curved over and fit into correspondingly shaped expanded areas against the inner-lying end of the slot-like cut-outs 10. Consequently, the part segments 12 can initially be pushed above the intermediate piece 9 from the outside over the tensioning elements 4, and the part segment 12 can thereafter be pushed along the longitudinal axis of the arrester column 2 in the direction of the intermediate piece 9 until the ends of the part segment are received in the slot-like cut-outs 10. The curved ends of the part segments 12a then lie in the expanded areas against the inner-lying end of the slot-like cut-outs 10, so that the part segments 12 are fixed in the radial direction.

The invention claimed is:

1. A surge arrester, comprising:
   an arrester column;
   end fittings;
   at least two tensioning elements being clamped under tension between said end fittings and clamping said arrester column under tension in an axial direction; and
   at least one collar encompassing at least one part of said tensioning elements in a plane lying in a perpendicular manner with respect to the surge arrester, in such a manner that said tensioning elements being fixed in a radial direction, said collar lying against an outer side of said arrester column and having radial protuberances receiving and encompassing said tensioning elements and fixing said tensioning elements in a tangential direction with respect to a center axis of the surge arrester.

2. The surge arrester according to claim 1,
   further comprising a cylindrical intermediate piece inserted in at least a cross-sectional plane of said arrester column, wherein a peripheral surface of said cylindrical intermediate piece having radial recesses formed therein; and
   wherein said collar has depressions lying between said radial protuberances of said collar and fit closely in said radial recesses in said cylindrical intermediate piece.

3. The surge arrester according to claim 2, wherein:
   said cylindrical intermediate piece inserted in said cross-sectional plane of said arrester column, having a cover surface with slot-shaped cut-outs formed therein that lead to the peripheral surface; and
   said collar having a plurality of similar part segments, and portions of said similar part segments facing towards the center axis of said arrester column are pushed into said slot-shaped cut-outs and as a consequence said similar part segments are fixed in the radial direction.

4. The surge arrester according to claim 1, wherein said collar has a closed shape.

5. The surge arrester according to claim 3, wherein a depth of said slot-shaped cut-outs of said cylindrical intermediate piece is less than a thickness of said cylindrical intermediate piece, and said slot-shaped cut-outs of said cylindrical intermediate piece extend in each case from one site of the peripheral surface of said cylindrical intermediate piece to a further site on the peripheral surface and said similar part segments have a closed shape, so that said slot-shaped cut-out receives a portion of said similar part segment and is thus fixed in the cross-sectional plane of said arrester column.

6. The surge arrester according to claim 3, wherein said similar part segments have an open shape and ends of said similar part segments are shaped in such a manner that correspondingly shaped expanded areas on an inner-lying end of said slot-shaped cut-outs of said cylindrical intermediate pieces receive said ends of said similar part segments and thus fix said similar part segments.

* * * * *